(12) United States Patent
Aumard et al.

(10) Patent No.: US 8,561,482 B2
(45) Date of Patent: Oct. 22, 2013

(54) SEALED SENSOR WITH STRAIN GAUGES

(75) Inventors: Jean-Pierre Aumard, Annemasse (FR); Vincent Bourdarel, La Clusaz (FR)

(73) Assignee: S.C.A.I.M.E. S.A., Annemasse (FR)

( * ) Notice: Subject to any disclaimer, the term of this patent is extended or adjusted under 35 U.S.C. 154(b) by 196 days.

(21) Appl. No.: 13/133,285

(22) PCT Filed: Mar. 19, 2009

(86) PCT No.: PCT/IB2009/000563
§ 371 (c)(1),
(2), (4) Date: Jun. 7, 2011

(87) PCT Pub. No.: WO2010/106388
PCT Pub. Date: Sep. 23, 2010

(65) Prior Publication Data
US 2011/0232393 A1 Sep. 29, 2011

(51) Int. Cl.
*G01L 1/04* (2006.01)
(52) U.S. Cl.
USPC .................................................. 73/862.627
(58) Field of Classification Search
USPC ...................................... 73/862.623–862.638
See application file for complete search history.

(56) References Cited

U.S. PATENT DOCUMENTS

| | | | |
|---|---|---|---|
| 4,107,985 A | 8/1978 | Sommer | |
| 4,150,729 A | 4/1979 | Ormond | |
| 4,332,174 A * | 6/1982 | Suzuki et al. | 73/862.633 |
| 4,488,611 A | 12/1984 | Jacobson | |
| 4,546,838 A | 10/1985 | Ormond | |
| 5,052,505 A * | 10/1991 | Naito et al. | 177/229 |
| 6,363,798 B1 * | 4/2002 | Gitis et al. | 73/862.391 |
| 6,694,829 B2 * | 2/2004 | Chimura et al. | 73/862.627 |
| 6,789,435 B2 * | 9/2004 | Hopkins | 73/862.632 |
| 6,794,587 B2 * | 9/2004 | Aumard et al. | 177/211 |
| 7,051,603 B2 * | 5/2006 | Loher et al. | 73/862.626 |
| 2003/0111277 A1 | 6/2003 | Aumard et al. | |
| 2004/0060372 A1 | 4/2004 | Hopkins | |

FOREIGN PATENT DOCUMENTS

| | | |
|---|---|---|
| EP | 0 399 466 A2 | 11/1990 |
| EP | 1 319 931 A1 | 6/2003 |

OTHER PUBLICATIONS

International Search Report, dated Aug. 5, 2010, from corresponding PCT application.

* cited by examiner

*Primary Examiner* — Lisa Caputo
*Assistant Examiner* — Octavia Davis-Hollington
(74) *Attorney, Agent, or Firm* — Young & Thompson

(57) ABSTRACT

A sealed sensor includes a test body configured as a deformable simple parallelogram, including a one-piece test body having a generally H- or X-shaped central opening extending therethrough, whose shape determines four hinge positions of the parallelogram, between the end of each arm of the opening and one face of the test body, and the thickness thereof. At least one hinge is a measuring hinge on one side of the test body. The outer face of the body has a recess and housing for strain gauges and circuits. At least one pair of side cavities define therebetween the width of the measuring hinge(s) and the thickness of the sheets of material connecting side edges of this measuring hinge to side edges of the test body corresponding to the hinge, preventing strains generated in the measuring hinges from being affected by strains from the side edges of the test body.

20 Claims, 6 Drawing Sheets

SEALED SENSOR WITH STRAIN GAUGES

The object of this invention is a measuring transducer of the type comprising a monolithic test body provided with strain gauges attached to this test body in at least one of its zones of elastic deformation under the effect of a force applied to said test body.

In general, the test body is formed by a monolithic deformable bar that can have the shape of a deformable parallelogram, of which one of the ends is attached to a fixed frame and of which the other is arranged to be able to accommodate a plate on which the load to be measured is placed. These transducers are described in, for example, the documents U.S. Pat. No. 4,150,729, U.S. Pat. No. 4,546,838 or U.S. Pat. No. 4,107,985.

This invention is aimed at implementing such a transducer that can be used in a hostile or corrosive environment, dirty, chlorinated or acidic water, etc.; this necessitates protecting the strain gauges in order to prevent their deterioration.

In general, the strain gauges are protected by a coating or film of a substance that is resistant to corrosive agents. Nevertheless, experience shows that it is always this protection that deteriorates first, requiring replacement of the transducer while its mechanical part, the test body, is still intact.

Transducers have been proposed in which the strain gauges are enclosed in sealed cavities, as is described in, for example, the document U.S. Pat. No. 4,488,611. This implementation, however, requires soldering of covers or metallic protection elements on the test body in the immediate vicinity of its deformation zones to encapsulate the strain gauges in a sealed manner. This construction allows durable protection of strain gauges, but degrades the precision and reliability of the measurement. Actually, the fact of welding these covers or protections in the immediate vicinity of the deformation zones of the test body causes structural modifications of the material comprising the test body in these zones, especially modifying its elastic characteristics that are the source of inaccuracies or measurement errors that cannot be easily corrected electrically.

Moreover, these sealed transducers require a separate measurement beam of two arms of the deformable parallelogram of the test body, generally placed in the central recess of this test body; this complicates its machining and thus makes the sealed transducer more expensive.

The applicant has developed a sealed transducer described in the document EP-1319931 in which the strain gauges and their associated electrical circuit are placed in a cavity of the test body of which the edges that must be blocked off by a welded plate are located in a zone of the test body not involved in the measurement, these edges being decoupled especially from the measurement beam. Here, however, the test body likewise comprises a primary beam that is connected to the measurement beam, separate from the edges of the deformable parallelogram and crossing the central cavity of the test body whose manufacture remains complex and costly.

The purpose of this invention is the implementation of a sealed strain gauge transducer in which, on the one hand, the cavities accommodating the strain gauges and their associated electrical circuit are arranged such that their edges that are intended to be welded to a metallic cover are mechanically removed and decoupled from the deformation zones being used for the measurement, and, on the other hand, whose test body in the form of a deformable parallelogram can be easily machined and especially does not include a beam crossing the central cavity of this test body such that a precision and better-value transducer is obtained.

Thus, this invention is designed to implement a transducer comprising a monolithic test body and encapsulated strain gauges, therefore that are protected against the environment, which eliminates the aforementioned problems, that is, which is resistant, of which the protection of the gauges does not influence the measurement characteristics, and which has a lower production cost.

The object of this invention is a sealed measurement transducer comprising a monolithic test body that is provided with strain gauges that is characterized by the features listed in independent claim 1. The particular embodiments of the invention are defined in the dependent claims.

The attached drawings schematically illustrate by way of example two embodiments of the transducer according to the invention.

Figure 1:
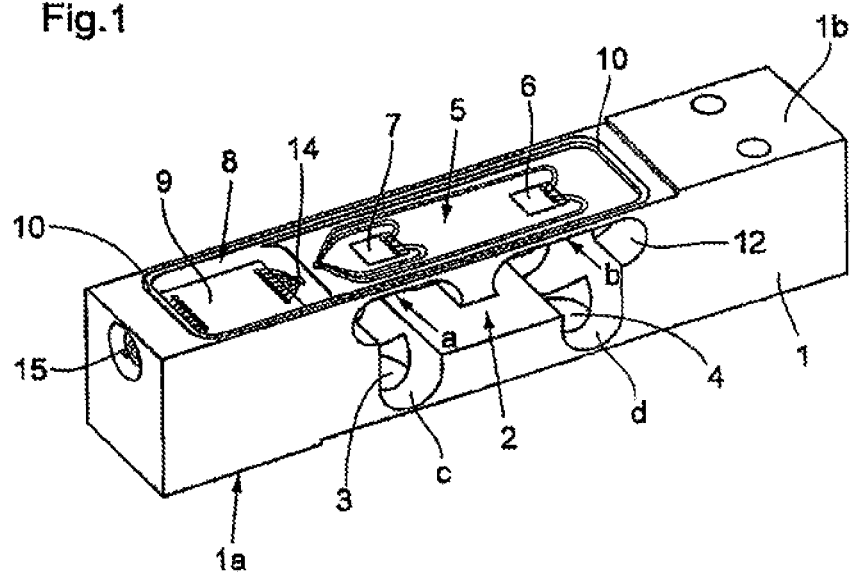
FIG. 1 is a perspective view of the transducer without its sealing cover.
Figure 2:
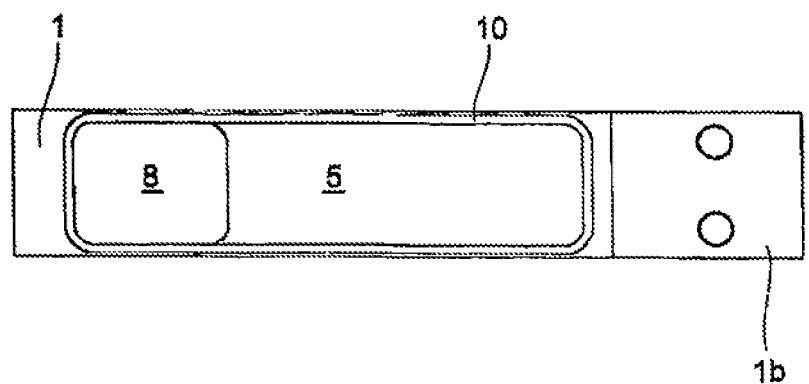
FIG. 2 is a top plan view of the transducer illustrated in FIG. 1.
Figure 3:
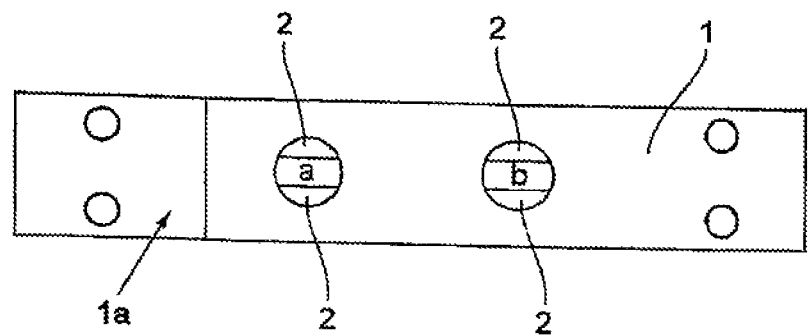
FIG. 3 is a bottom plan view of the transducer illustrated in FIG. 1.
Figure 4:
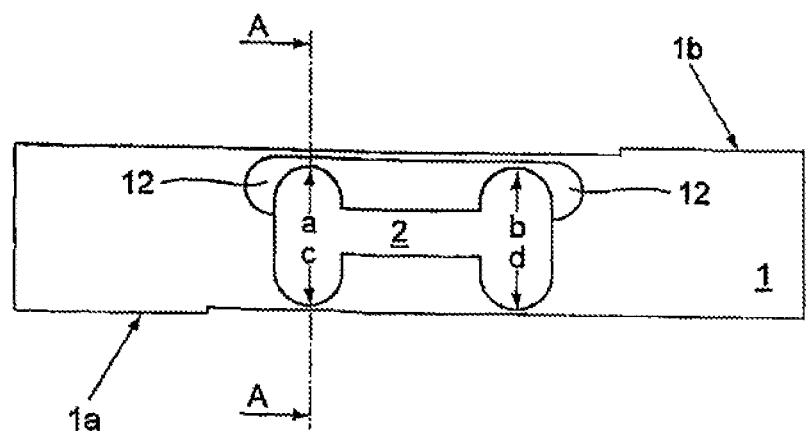
FIG. 4 is a side view of the transducer illustrated in FIG. 1.
Figure 5:
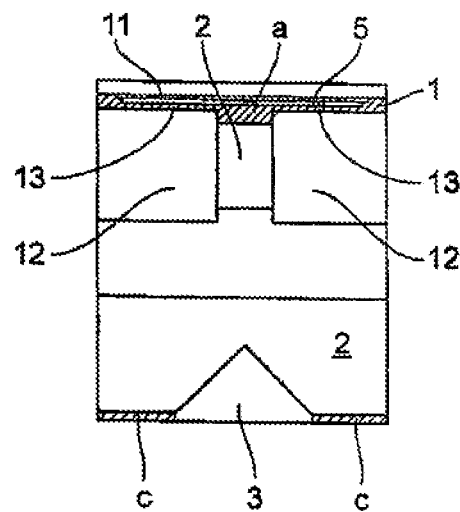
FIG. 5 is a cutaway along line A-A of FIG. 4.
Figure 6:
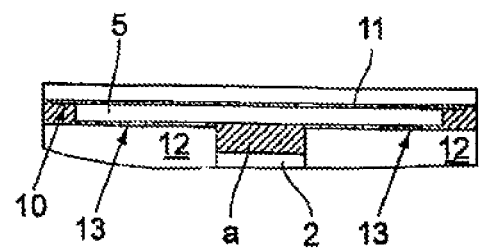
FIG. 6 is a detail on a larger scale of FIG. 5.
Figure 7:
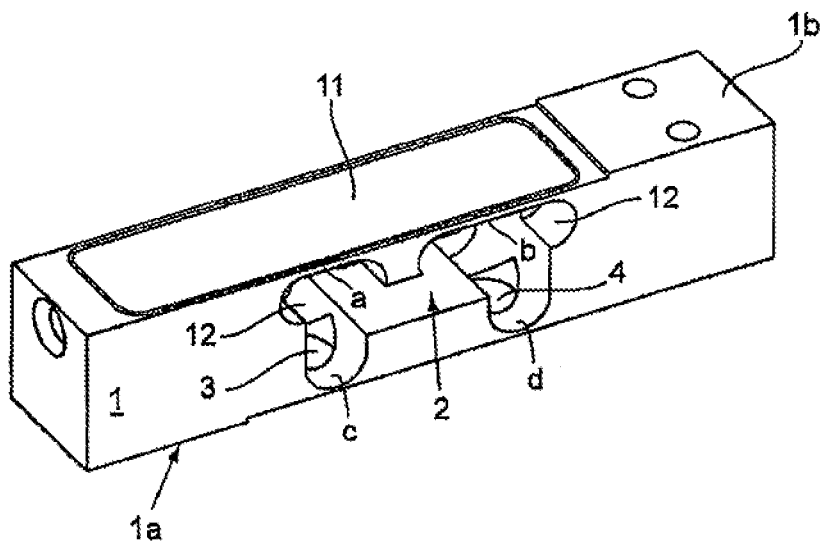
FIG. 7 is a perspective view of the transducer illustrated in FIG. 1, its sealing cover being welded in place on the test body.

The object of this invention is a sealed, strain gauge weighing transducer of the simple parallelogram type. To achieve this proposed object, a test body of the deformable parallelogram type is used to accommodate the load eccentricities. This transducer does not include, as is general use, a third complementary beam crossing the opening of the parallelogram in order to simplify as much as possible the machining of the test body and thus to reduce its cost. This test body is formed by a parallelogram composed of four hinges, of which at least one but preferably two has/have a special shape that is characterized by a central narrow part connected on either side by a very thin web (0.1 to 0.4 mm) to two external parts that are thick enough to withstand welding of the metallic closing sheet and thus to form a sealed cavity accommodating the gauges and therefore ensuring their protection relative to a corrosive external environment. The narrow central parts (4 to 8 mm) that are called hinges are composed of a cross-section of material between the flat part where the strain gauges are cemented and the concave surface (radius 6 mm) such that the deformations are limited to these thinned zones alone, thus comprising a parallelogram with a relatively high steepness.

Conversely, the connecting webs of the hinges to the external parts are designed in such a way as to maximize the possible flexibility due to their shape and their small thickness in order to perfectly decouple the measurement parallelogram from the external parts that in concert with the closing plate ensure the tightness of the assembly.

With reference to FIGS. 1 to 7 of the drawings, it is apparent that the measurement transducer according to this invention comprises a monolithic test body 1 comprising a deformable parallelogram composed of steel, stainless steel or alloy thereof, aluminum or another elastic material, of which one end 1a is designed to be attached to a frame, whereas the other end 1b is equipped to accommodate a plate on which a load to be weighed is placed or a force to be measured is applied. This test body (see FIG. 4) is crossed transversely by a central recess 2 with the general shape of an H defining the four hinges a, b, c, d of the deformable parallelogram, of which at least one (a) is a measurement hinge (see FIG. 6). Each end of the vertical legs of the H that forms the central recess 2 has a cylindrical shape whose generatrices are perpendicular to the longitudinal axis of the test body 1.

The two lower hinges c, d that are used for deformation of the test body but not for measurement have a slight thickness and can again be weakened by openings 3, 4 that are made in the lower wall of the test body 1. This is more especially useful in the case of a test body for small nominal loads.

The lower hinges c and d have a thickness of roughly 0.5 mm to 1 mm, for example, depending on the nominal load of the transducer. The upper hinges a, b comprise the parts of the test body that will not only ensure deformability of the test body, but that are used to measure the bending stresses that will be measured using the strain gauges. These measurement hinges a, b—in certain variants a single one of these hinges—have a greater thickness, roughly 1 mm to 2 mm for example, likewise depending on the nominal load of the transducer. The numbers shown above are valid for transducers designed for a nominal load of from 5 to 10 kilograms and as indicated above can vary depending on the nominal load of the envisioned transducer. The larger the nominal load that is able to reach several hundred kilograms, the thicker the hinges.

The upper surface of the test body 1 comprises, on the one hand, a hollow 5 of small depth designed to accommodate strain gauges 6, 7 that are attached to the bottom of this hollow 5 to the right of the measurement hinges a, b, and, on the other hand, a deeper housing 8 designed to accommodate the electrical circuits 9 linked to the strain gauges 6, 7. This hollow 5 and this housing 8 have a rim 10 located in the same plane, parallel to the upper surface of the test body 1. This rim 10 makes it possible to position a closing plate or cover 11 covering and blocking off the hollow 5 and the housing 8 that will be welded by, for example, laser on said rim 10 to ensure perfect tightness of the hollow 5 and the housing 8.

To be certain that the zone of the test body 1 located around the hollow 5 does not participate in the measurement, since these zones can be affected with respect to the characteristics of the material by the welding of the cover 11, pairs of side cavities 12 are machined on either side of the test body delineating a width of the hinges a, b that are used for measurement, roughly 4 to 8 mm for test bodies with a nominal capacity of 5 to 10 kilograms. These pairs of side cavities likewise define the thickness of the webs 13 connecting the hinges a, b to the corresponding edges of the test body 1.

Thus, the material of the test body 1 that is used to measure the strains is limited to the measurement hinges a and b having a well-defined thickness and width. The webs 13 of material connecting the hinge a, or b, to the upper side edges of the test body 1 have a slight thickness, roughly from 0.1 mm to 0.4 mm, and ensure complete decoupling between the hinges a, b and the upper edge 10 of the test body 1 that must be welded to the cover 11. For this reason, it can be guaranteed that the strains that are measured in the material of the hinges a and b are not influenced by the deformations of these webs 13 when the test body 1 is being loaded.

On the other hand, the machining of the test body 1 is made much simpler due to the shape of the central opening 2 and of the side cavities 12 and the absence of a median beam crossing this central opening 2.

In the case in which only one of the upper hinges a, b is used for measurement, the side cavities 12 made in the test body 1 can only enclose the zone surrounding this single measurement hinge.

Figure 8:
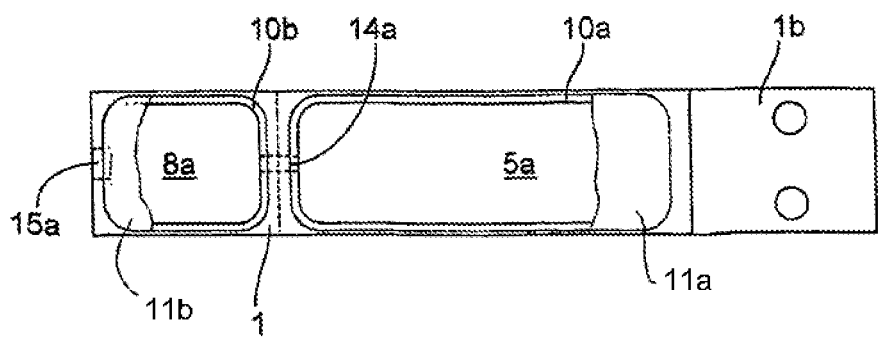
FIG. 8 is a top view of a second embodiment of the transducer.

A hole 14 connects the hollow 5 to the housing 8 for passage of the wires connecting the strain gauges 6, 8 to the electrical circuit 9. Such a hole 14 can be omitted in the case of the embodiment described so far since it comprises only one cover 11 and the housing 8 is in communication with the hollow 5. This hole is only critical in the embodiments in which the hollow 5 and the housing 8 do not communicate and are each blocked off by a separate cover, as shown in FIG. 8.

Finally, a hole 15 connects the housing 8 to the outside of the test body 1 that can be equipped with a sealed cable passage for connecting the electrical circuit 9 to the equipment located outside of the test body 1.

The principle of this transducer is to make a central recess 2 in the test body 1 whose shape defines four hinges or deformation zones of the parallelogram that is implemented in this way. This central recess 2 likewise determines the thickness of the measurement hinge or hinges a, b. The width of these measurement hinges a, b is then itself determined by the side cavities 12 that likewise determine the thickness of the webs 13 connecting the measurement hinges a, b to the side of the test body 1 that is intended to accommodate a welded cover 11. Thus, with a minimum of machining of the test body 1, perfect decoupling is accomplished between the measurement hinge or hinges a, b and the zones of the test body that are intended to be welded to the cover; this makes it possible to implement a sealed, precision transducer of low cost.

Figure 9:
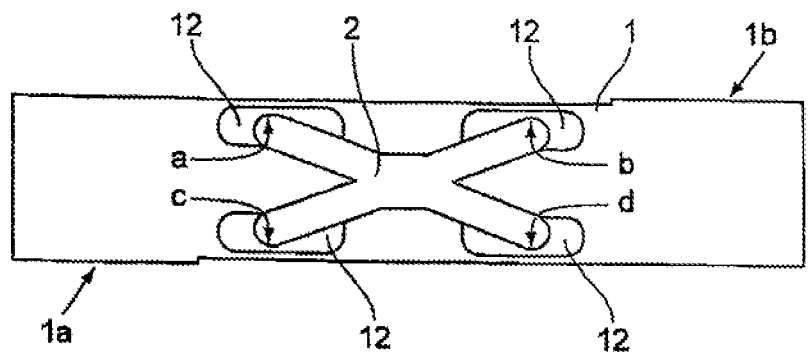
FIG. 9 is a side view of the transducer illustrated in FIG. 8.
Figure 10:
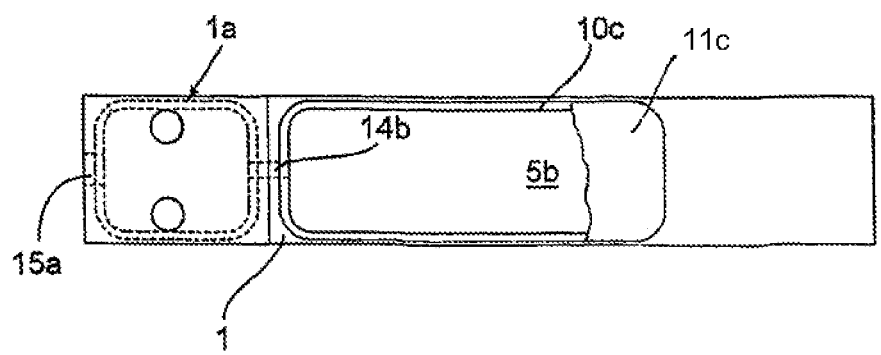
FIG. 10 is a bottom view of the transducer illustrated in FIG. 8.
Figure 11:
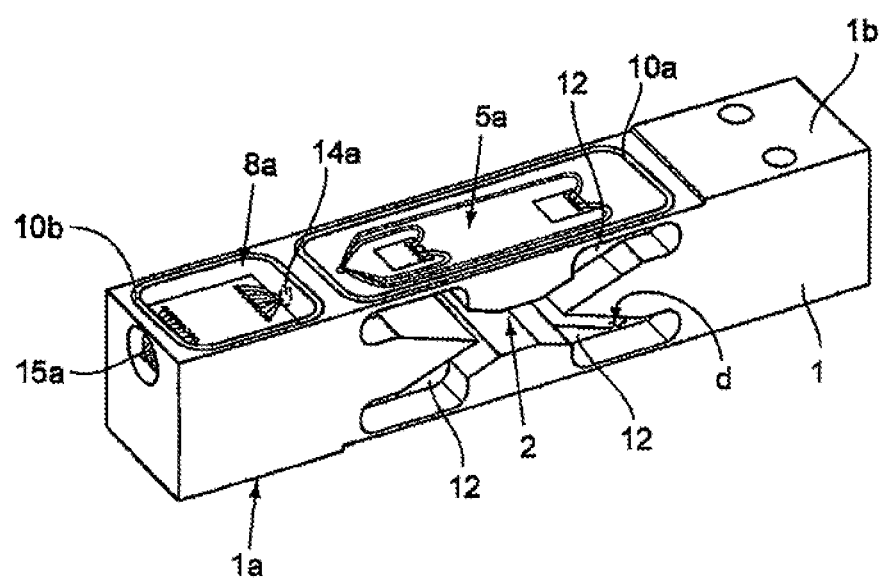
FIG. 11 is a perspective representation of the transducer according to the second embodiment.

The second embodiment of the transducer according to the invention illustrated in FIGS. 9 to 11 comprises a monolithic test body 1 composed of a central recess 2 that has the general shape of an X, of which the end of each arm has the shape of a cylinder whose generatrices are perpendicular to the longitudinal axis of the test body 1.

The two upper ends of the central recess 2 define the position and the thickness of the measurement hinges a, b, whereas the two lower ends of this central recess define the position and the thickness of the measurement hinges c and d.

Pairs of cavities 12 are machined on either side of the test body to the right of each hinge a, b, c, d, determining the width of these hinges, all of which are measurement hinges, as well as the thickness of the webs 13 connecting these hinges to the adjacent edge of the test body 1, as is the case in the first embodiment for the measurement hinges a, b. In this embodiment, the four hinges a, b, c, and d are measurement hinges, and each of them is surrounded by one pair of side cavities 12.

In this second embodiment of the test body 1, the latter comprises on a first surface, the upper surface here, a hollow 5a allowing the strain gauges to be housed as in the first embodiment, and the hole 14a allows connection of these strain gauges to their associated circuits housed in the housing 8a, discharging likewise on the upper surface of the test body and comprising a lug 10b. The housing 8a and the hollow 5a are blocked off by separate covers 11a, 11b welded on the lugs 10a, 10b respectively.

In this embodiment, the lower surface of the test body comprises a hollow 5b housing the strain gauges linked to the measurement hinges c and d and a second hole 14b allowing them to be connected to their associated circuits located in the housing 8a. This housing 8a is connected to the outside of the test body by a passage 15a designed to accommodate a sealed cable passage. Cover 11c is welded on lug 10c.

In this embodiment and in all those comprising separate covers for the hollow 5 housing the strain gauges and the housing 8 containing the electrical circuits, the test body can be tested once the hollow or hollows 5 are blocked off by their welded covers, and then the adjustments necessary to the corresponding electrical circuits can be made if necessary before blocking off the housing 8 by its welded cover. The welding of the cover of the housing 8 no longer modifies the characteristics of the test body 1 since this housing is located in a nondeformable part of the test body. Thus, the precision and linearity of the electrical response of the transducer to the loads that it is measuring can again be improved.

As seen from the above, this transducer always comprises a test body in the form of a single, one-piece, deformable parallelogram comprising a central recess 2 transversely crossing the test body and having the general shape of an H or an X. The ends of the arms of the central recess 2 in H or X shape have a cylindrical shape whose generatrices are perpendicular to the longitudinal axis of the test body 1 and parallel to the upper and lower surfaces of this test body. This shape of the central recess 2 allows formation of the four hinges of the test body 1 whose bending deformations of at least certain among them will be used to act on the strain gauges.

The transducer can include one, two, three or four measurement hinges. When it includes one or two of them, these measurement hinges are preferably located on the same side of the test body 1.

The central recess 2 determines the position and the thickness of the measurement hinges.

The test body again includes pairs of side cavities 12, the cavities 12 of each pair being located on either side of each measurement hinge and determining the width of said measurement hinges and the thickness of the webs 13 connecting each measurement hinge to one side of the test body. These thin webs 13 allow decoupling of the edges of the test body 1 relative to the measurement hinges such that these edges of the test body do not participate in deformations of the hinges during the bending of the test body. Thus, even if the elastic characteristics of the material of the upper and lower edges of the test body are modified by welding of the cover or covers blocking off the hollows 5, 5a in a sealed manner, this has no effect on the strains measured on the measurement hinges.

Finally, the housing 8, 8a is located in one zone of the test body that is not subject to deformation such that the welding of the cover blocking off this housing no longer influences the measurement.

It should be noted again that machining of the test body is simple, composed essentially of milling; this allows the cost of manufacture of this transducer to be reduced.

The invention claimed is:

1. A sealed strain gauges transducer of the test body type, comprising:
a one piece test body (1) formed as a simple deformable parallelogram with a first end (1a) attachable to a frame and a second end (1b) equipped to accommodate a load plate, the test body having an upper face and a lower face, the one piece test body (1) further comprising
only one central recess (2) with four arms defining a general shape of an H or an X transversely crossing the test body,
four hinges (a, b, c, d), a position and a thickness of each of the four hinges being defined by the central recess, each of the four hinges (a, b, c, d) being located between an end of a respective arm of the recess (2) and the upper and lower faces of the test body (1), two of the hinges being located nearer the upper face of the test body and two of the hinges being located nearer the lower face of the test body, at least one of the hinges (a, b, c, d) is a measure hinge,
a first hollow (5) and a housing (8) with a circumference and opening to the upper face of the test body (1) with a strain gauge attached to a bottom of the first hollow (5) facing the measurement hinge and associated electrical circuits located in the housing (8), the hollow (5) being located over the measure hinge (5),
a passage (15a) connecting the housing (8) to an outside of the test body (1) accommodating a sealed cable passage,
a pair of side cavities (12) defining therebetween a width of the measure hinge (5) and a thickness of webs of material (13) connecting side edges of the measure hinge (5) to side edges of the test body (1) corresponding to the measure hinge (5) in such a way to prevent strains caused in the measure hinge (5) from being affected by strains originating from said side edges of the test body (1), and
at least one metallic cover (11) welded along the circumference of the first hollow (5) and the housing (8) and tightly sealing the hollow (5) and the housing (8).

2. The transducer according to claim 1, wherein,
the at least one metallic cover (11) is comprised of separate first and second covers, the first cover welded along the circumference of the first hollow (5) and the second cover welded along the circumference of the housing (8), the first and second covers respectively tightly sealing the hollow (5) and the housing (8), and
further comprising a second hollow (5b) opening to the lower face of the test body (1).

3. The transducer according to claim 1, wherein,
the ends of the arms of the central recess (2) is in the H shape, and
the arms each have a cylindrical shape with generatrices perpendicular to a longitudinal axis of the test body and parallel to upper and lower surfaces of the test body.

4. The transducer according to claim 1, wherein,
the ends of the arms of the central recess (2) is in the X shape, and
the arms each have a cylindrical shape with generatrices perpendicular to a longitudinal axis of the test body and parallel to upper and lower surfaces of the test body.

5. A sealed strain gauges transducer of the test body type, comprising:
a one piece test body (1) comprising a simple deformable parallelogram with an end (1b) equipped to accommodate a load plate, the test body having an upper face and a lower face, the one piece test body (1) further comprising
only one central recess (2) with arms defining a general shape of an H or an X transversely crossing the test body (1), the shape defining a position and a thickness of four hinges (a, b, c, d) of the deformable parallelogram, the four hinges (a, b, c, d) being located between an end of each arm of the recess (2) and the upper and lower faces of the test body (1), at least one of the hinges (a, b, c, d) is a measure hinge,
a hollow (5) and a housing (8) on at least one of the upper and lower faces of the test body (1) with strain gauges and associated electrical circuits respectively located in the hollow (5) and the housing (8), the hollow (5) being located over the measure hinge (5),
a passage (15a) connecting the housing (8) to an outside of the test body (1) to accommodate a sealed cable passage,
at least one pair of side cavities (12) defining therebetween a width of the measure hinge (5) and a thickness of webs of material (13) connecting side edges of the measure hinge (5) to side edges of the test body (1) corresponding to the measure hinge (5) in such a way to prevent strains caused in the measure hinge (5) from being affected by strains originating from said side edges of the test body (1), and at least one thin flat metallic cover (11) welded on the upper face or the lower face of the test body (1) along a circumference of the hollow (5) and the housing (8) to tightly seal the hollow (5) and the housing (8).

6. Sealed transducer according to claim 5, wherein the ends of the arms of the central recess (2) in H or X shape have a cylindrical shape whose generatrices are perpendicular to the longitudinal axis of the test body and parallel to upper and lower surfaces of the test body.

7. Sealed transducer according to claim 6, wherein the cavities of one pair of side cavities (12) are located on either side of the at least one measurement hinge.

8. Sealed transducer according to claim 6, wherein the transducer comprises two measurement hinges (a, b) that are close to the upper face of the test body (1).

9. Sealed transducer according to claim 6, wherein the transducer comprises two measurement hinges (c, d) that are close to the lower face of the test body (1).

10. Sealed transducer according to claim 5, wherein the cavities of one pair of side cavities (12) are located on either side of the at least one measurement hinge.

11. Sealed transducer according to claim 10, wherein the cavities of one pair of side cavities (12) are located on either side of two measurement hinges located on a same surface of the test body.

12. Sealed transducer according to claim 10, wherein the transducer comprises two measurement hinges (a, b) that are close to the upper face of the test body (1).

13. Sealed transducer according to claim 10, wherein the transducer comprises two measurement hinges (c, d) that are close to the lower face of the test body (1).

14. Sealed transducer according to claim 5, wherein it comprises two measurement hinges (a, b) that are close to the upper face of the test body (1).

15. Sealed transducer according to claim 5, wherein the transducer comprises two measurement hinges (c, d) that are close to the lower face of the test body (1).

16. Transducer according to claim 15, wherein the transducer comprises a second hollow in the lower face of the test body (1).

17. Sealed transducer according to claim 16, comprising one strain gauge attached to the bottom of the hollow (5) and the second hollow (5*b*) facing each measurement hinge (a, b, c, d).

18. Sealed transducer according to claim 5, wherein the transducer comprises at least one strain gauge (6, 7) attached to a bottom of the hollow (5) facing the measurement hinge.

19. Sealed transducer according to claim 5, wherein the transducer comprises two separate covers, one cover blocking off the housing (8) and another cover blocking off the hollow (5).

20. Transducer according to claim 19, wherein the transducer comprises a third cover blocking off the second hollow (5*b*) of the lower face of the test body (1).

* * * * *